(12) United States Patent
Li (10) Patent No.: US 9,164,780 B2
(45) Date of Patent: Oct. 20, 2015

(54) METHOD AND DEVICE FOR AN INTELLIGENT CONTROL OF PORTABLE ELECTRONIC DEVICES

(71) Applicant: Tencent Technology (Shenzhen) Company Limited, Shenzhen (CN)

(72) Inventor: Danhua Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/040,172

(22) Filed: Sep. 27, 2013

(65) Prior Publication Data

US 2014/0089948 A1    Mar. 27, 2014

Related U.S. Application Data

(63) Continuation of application No. PCT/CN2013/081417, filed on Aug. 13, 2013.

(30) Foreign Application Priority Data

Aug. 14, 2012  (CN) .......................... 2012 1 0288260

(51) Int. Cl.
 *G06F 9/54*   (2006.01)
 *G06F 9/445* (2006.01)
 *G06F 1/32*  (2006.01)

(52) U.S. Cl.
 CPC .............. *G06F 9/445* (2013.01); *G06F 1/3206* (2013.01); *G06F 1/3234* (2013.01)

(58) Field of Classification Search
 CPC .... Y02B 60/186; Y02B 60/50; G06F 1/3287; G06F 9/445; G06F 1/3206; G06F 1/3234
 See application file for complete search history.

(56) References Cited

U.S. PATENT DOCUMENTS

| 7,403,232 | B1  | 7/2008 | Orlicki et al. | |
|-----------|-----|--------|----------------|-|
| 2006/0053311 | A1* | 3/2006 | Chary | 713/300 |
| 2006/0140140 | A1* | 6/2006 | Fuccello | 370/311 |
| 2012/0054516 | A1  | 3/2012 | Shayer | |
| 2012/0164971 | A1  | 6/2012 | Choi et al. | |

FOREIGN PATENT DOCUMENTS

| CN | 101313518 A | 11/2008 |
|----|-------------|---------|
| CN | 102129287 A | 7/2011 |

OTHER PUBLICATIONS

Tencent Technology (Shenzhen) Company Limited, International Search Report and Written Opinion, PCT/CN2013/081417, Nov. 21, 2013, 11 pgs.

* cited by examiner

*Primary Examiner* — H S Sough
*Assistant Examiner* — Syed Roni
(74) *Attorney, Agent, or Firm* — Morgan, Lewis & Bockius LLP (57) ABSTRACT

Methods and devices for intelligently controlling a portable electronic device are described. The method includes detecting a selection of a respective application program of the plurality of application programs. The method also includes, in response to detecting the selection of the respective application program of the plurality of application programs, identifying one or more predefined hardware operations that do not correspond to one or more hardware operations associated with the respective application program; conditionally deactivating the one or more predefined hardware operations; and launching the respective application program.

17 Claims, 8 Drawing Sheets

METHOD AND DEVICE FOR AN INTELLIGENT CONTROL OF PORTABLE ELECTRONIC DEVICES

RELATED APPLICATIONS

This application is a continuation application of PCT patent application No. PCT/CN2013/081417, entitled "METHOD AND DEVICE FOR AN INTELLIGENT CONTROL OF PORTABLE ELECTRONIC DEVICES" filed on Aug. 13, 2013, which claims priority to Chinese Patent Application No. 201210288260.4, entitled "APPLICATION CONTROL METHOD AND DEVICE THEREFOR", filed on Aug. 14, 2012, both of which are incorporated by reference in their entirety.

TECHNICAL FIELD

The present application relates to the technical field of portable electronic devices, and in particular, to intelligently controlling portable electronic devices.

BACKGROUND ART

With the rapid development of communication technology and electronics technology, portable electronic devices have become necessary communication tools for people. With the wide spread of portable electronic devices having a large screen, high brightness and high performance, the battery capacity has become the main bottleneck that restricts the user of the portable electronic devices.

Currently, when a user does not want to use a certain function of a portable electronic device, the user needs to manually turn off this function. For example, when the user finds that the quantity of electricity of the battery is low, the user needs to dim out the screen and turn off the APIs (Application Programming Interface) of such functions as WiFi or Bluetooth manually, so as to save the quantity of electricity of the terminal. When the user wants to use functions such as WiFi or Bluetooth, the user needs to manually turn on these functions again.

However, this increases the user's manual interaction with the terminals and degrades the user's experience in using the terminals.

SUMMARY

In order to save the quantity of electricity of a terminal without increasing user's manual operations, the embodiments described herein provide methods and devices for controlling portable electronic devices. The technical solution, in accordance with some embodiments, is as follows.

In some embodiments, a method for controlling an application is provided, the method comprising: acquiring the current execution state of a terminal; determining an application programming interface API invocation mode corresponding to the current execution state of the terminal according to the preset correlation between an execution state of the terminal and the API invocation mode; and executing the API control thereof under the determined API invocation mode.

In another aspect, a device for controlling an application is provided. In accordance with some embodiments, the device comprises: an acquisition module for acquiring the current execution state of a terminal; a determination module for determining an application programming interface API invocation mode corresponding to the current execution state of the terminal according to the preset correlation between an execution state of the terminal and the API invocation mode; and an execution module for executing the API control thereof under the determined API invocation mode.

In accordance with some embodiments, a method is performed by a portable electronic device with memory storing a plurality of application programs. The method includes detecting a selection of a respective application program of the plurality of application programs. The method also includes, in response to detecting the selection of the respective application program of the plurality of application programs, identifying one or more predefined hardware operations that do not correspond to one or more hardware operations associated with the respective application program; conditionally deactivating the one or more predefined hardware operations; and launching the respective application program.

In accordance with some embodiments, a portable electronic device includes means for detecting a selection of a respective application program of a plurality of application programs stored in the portable electronic device. The instructions also include means, enabled in response to detecting the selection of the respective application program of the plurality of application programs, including: \means for identifying one or more predefined hardware operations that do not correspond to one or more hardware operations associated with the respective application program; means for conditionally deactivating the one or more predefined hardware operations; and means for launching the respective application program.

In accordance with some embodiments, a portable electronic device includes one or more processors; and memory storing a plurality of application programs. The memory further stores instructions for executions by the one or more processors. The instructions include instructions for detecting a selection of a respective application program of the plurality of application programs. The instructions also include instructions for, in response to detecting the selection of the respective application program of the plurality of application programs, identifying one or more predefined hardware operations that do not correspond to one or more hardware operations associated with the respective application program; conditionally deactivating the one or more predefined hardware operations; and launching the respective application program.

In accordance with some embodiments, a computer readable storage medium stores a plurality of application programs and instructions for execution by one or more processors of a portable electronic device. The instructions include instructions for detecting a selection of a respective application program of the plurality of application programs. The instructions also include instructions for, in response to detecting the selection of the respective application program of the plurality of application programs, identifying one or more predefined hardware operations that do not correspond to one or more hardware operations associated with the respective application program; conditionally deactivating the one or more predefined hardware operations; and launching the respective application program.

The beneficial effects of the technical solution provided in the embodiments of the present invention include the following: acquiring the current execution state of a terminal; determining an application programming interface API invocation mode corresponding to the current execution state of the terminal according to the preset correlation between an execution state of the terminal and the API invocation mode; and executing the API control thereof under the determined API invocation mode. By way of controlling an API under a terminal's different execution states, the electricity consumption by unnecessary applications in the terminal is reduced, the goal of saving the quantity of electricity used by the terminal is accomplished without increasing a user's operation, and the user experience is improved.

DESCRIPTION OF THE DRAWINGS

In order to more clearly illustrate the technical solution in the embodiments of the present invention, the figures to be used for describing the embodiments will be outlined hereinafter, and apparently, the figures described hereinafter are merely some embodiments of the present invention, and for those skilled in the art, other figures can be obtained according to these figures without any inventive efforts.

DETAILED DESCRIPTION

In order to make the objects, technical solution and advantages of the present invention more clear, the embodiments of the present invention will be further described in detail in conjunction with the accompanying drawings.

Embodiment I

Figure 1:
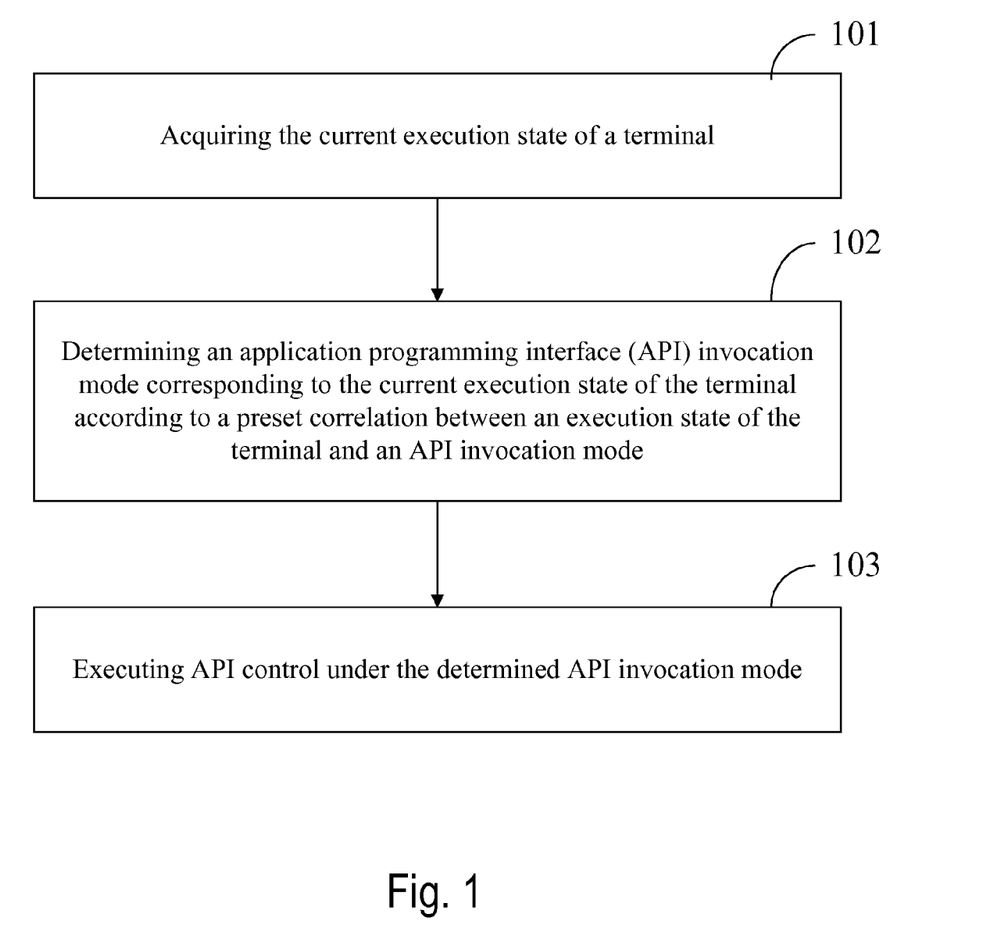
FIG. 1 is a flowchart of a method for controlling an application provided in accordance with some embodiments.

Referring to FIG. 1, a method for controlling an application is provided, the method comprising: acquiring (101) the current execution state of a terminal; determining (102) an application programming interface API invocation mode corresponding to the current execution state of the terminal according to the preset correlation between an execution state of the terminal and the API invocation mode; and executing (103) the API control thereof under the determined API invocation mode.

The acquiring of the current execution state of the terminal comprises: monitoring an operation command received by the terminal; and learning the current execution state of the terminal according to the operation command.

The API invocation mode comprises: turning on/off a preset API.

Furthermore, the executing of the API control thereof under the determined API invocation mode comprises: acquiring information about an API to be turned off and/or information about an API to be turned on under the API invocation mode; turning off the API to be turned off according to the information thereabout; and/or, turning on the API to be turned on according to the information thereabout.

Optionally, the method further comprises: outputting alarm information or adjusting the API invocation mode of the terminal when the quantity of electricity of the terminal reaches an alarm value.

The beneficial effects of this embodiment are as follows: acquiring the current execution state of a terminal; determining an application programming interface API invocation mode corresponding to the current execution state of the terminal according to the preset correlation between an execution state of the terminal and the API invocation mode; and executing the API control thereof under the determined API invocation mode. By way of controlling an API under a terminal's different execution states, the electricity consumption by unnecessary applications in the terminal is reduced, the goal of saving the quantity of electricity used by the terminal is accomplished without increasing a user's operation, and the user experience is improved.

Embodiment II

The embodiments of the present invention provide a method for controlling an application, and in this embodiment, there is a plurality of APIs in a terminal, and APIs are some predefined functions which can provide application programs and developers with the capability of accessing a group of routines based on certain software or hardware. Each application program on the terminal corresponds to one API, and a user can access the corresponding application program via this interface. For example, in the situation where an API corresponds to GPRS, an API corresponds to WIFI, an API corresponds to screen brightness, and an API corresponds to a key background light, when the user turns on any one API, a corresponding application program thereof will be started up accordingly. In this embodiment, in order to save the quantity of electricity of the terminal, the turning on and/or turning off of different APIs are controlled according to the specific usage of the terminal. In particular, the correlation between an execution state and an API invocation mode is preset, i.e. one API invocation mode is set to correspond to each usage scenario of the terminal accordingly, wherein the API invocation mode comprises: turning off or turning on a preset API. For example, when the user turns off the screen of the terminal, and at this moment there is no operation on the terminal, in view of the execution state of the terminal at this moment, the API invocation mode is set to be an API for turning off WIFI and an API for turning off GPRS and so on; and when the terminal is playing a song online and there is no other operation, in view of the execution state of the terminal at this moment, the API invocation mode is set to turn off the screen of the terminal, so as to save the quantity of electricity of the terminal. In this embodiment, each application of the terminal corresponds to one execution state of the terminal, and each execution state corresponds to one API. As shown in Table 1:

TABLE 1

| The execution state of a terminal | API invocation mode |
| --- | --- |
| Playing a song stored in the terminal | Turning off the terminal screen, turning off WIFI, and turning off GPRS |
| Browsing a webpage | Automatic brightness of the terminal screen, reducing CPU operating frequency |
| Dialing a phone call | Turning off the terminal screen, turning off WIFI, turning off GPRS, and reducing operating frequency |
| ... | ... |

It needs to be noted that in table 1 the API invocation mode corresponding to the execution state of the terminal can be adjusted according to the actual usage of the terminal; the content above is merely exemplary, and the particular application process is not limited to the abovementioned correlation.

Figure 2:
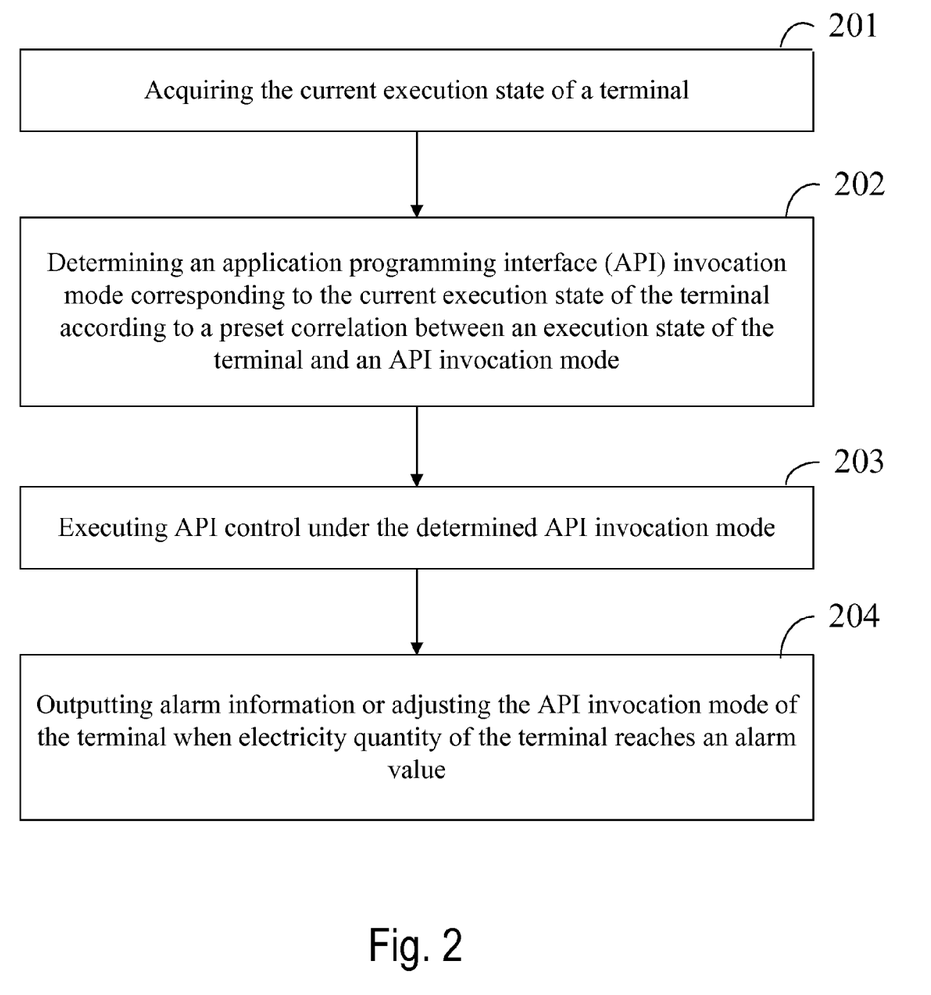
FIG. 2 is a flowchart of a method for controlling an application provided in accordance with some embodiments.

Referring to FIG. 2, the method flow comprises: acquiring (201) the current execution state of a terminal The terminal in this embodiment can particularly be a smart phone, a PC (Personal Computer), an MP3 (Moving Picture Experts Group Audio Layer III) player, a PDA (Personal Digital Assistant), etc., which is not limited in this embodiment.

In this step, the behavior of the user on the terminal is detected in real time to acquire the current execution state of the terminal, wherein the particular acquiring of the current execution state of the terminal comprises: monitoring an operation command received by the terminal; and learning the current execution state of the terminal according to the operation command. In this embodiment, the operation command received by the terminal is monitored, which operation command is executed when the user triggers the terminal, and the current execution state of the terminal can be learnt according to different operation commands. For example, the user clicks to play a song on the terminal, then it can be learnt that the current execution state of the terminal is the state of playing a song on the terminal when an operation command of playing a song is monitored.

Step 202 is the step of determining an API invocation mode corresponding to the current execution state of the terminal according to the preset correlation between an execution state of the terminal and the API invocation mode.

In this step, the correlation between the execution state of the terminal and the API invocation mode is preset, and when the current execution state of the terminal is acquired, an API invocation mode corresponding to the current execution state of the terminal is searched in this correlation. For example, the current execution state of the terminal is the state of playing a song on the terminal, then Table 1 will be search, and the corresponding API invocation mode thereof is turning off the terminal screen, turning off WIFI, and turning off GPRS.

Step 203 is the step of executing power-saving control under the determined API invocation mode.

In this embodiment, after having determined the API invocation mode corresponding to the current execution state of the terminal, the preset API will be turned off or turned on accordingly, so that the quantity of electricity used by the terminal can be controlled effectively so as to reduce waste of the terminal's quantity of electricity by unnecessary application. The particular executing of power-saving control under the determined API invocation mode comprises: acquiring information about an API to be turned off and/or information about an API to be turned on under the API invocation mode; turning off the API to be turned off according to the information thereabout; and turning on the API to be turned on according to the information thereabout.

In this embodiment, after having determined the API invocation mode, the information about the API to be turned on or turned off in this invocation mode will be acquired, and a corresponding control command will be generated according to the information about the API to be turned on or turned off, so as to simulate an operation of the user to close or open the API of an application.

In this embodiment, since the operation of the user to the terminal changes ceaselessly, when the terminal performs switching under different scenarios, the corresponding API invocation mode will also change, such that the use of the terminal by the user will not be affected under the premise of saving power, thereby improving the user experience. For example, after having browsed a webpage, the user exits the browser and turns off the terminal screen, but after five minutes, the user opens the browser again, and the current execution state of the terminal changes from a network connected state to a network disconnected state and again to a network connected state, and in order to save the quantity of electricity of the terminal, the invoked API will also change accordingly during this process.

Step 204 is the step of outputting alarm information or adjusting the API invocation mode of the terminal when the quantity of electricity of the terminal reaches an alarm value.

In this embodiment, furthermore, a quantity of electricity alarm value setting unit is provided for the user, and in this unit, the user can set an quantity of electricity alarm value, such as setting the alarm value as 20% of the quantity of electricity, and then when the total quantity of electricity of the terminal battery is lower than 20%, alarm information can be output to the user, which alarm information can be output in the form of text, and can also be output in the form of a battery icon, which is not limited in this embodiment particularly. In this embodiment, when outputting the alarm information, the user can switch the corresponding power-saving mode according to the alarm information, and the corresponding power-saving mode will adjust the current API invocation mode of the terminal, for example, the alarm information is output when the user is listening to a song, the user can choose to adjust same to a more power-saving mode, i.e., after selection, the current API invocation mode can be adjusted to a more power-saving API invocation mode, for example, this API invocation mode include an API for closing the song being played. Of course, it is also possible that the current API invocation mode is not adjusted, which is not limited in this embodiment particularly.

Optionally, the user can also set to switch the API invocation mode of the terminal after the quantity of electricity reaches the alarm value. When the quantity of electricity of the terminal reaches the alarm value, it can switch to the more power-saving mode automatically according to the switching manner preset by the user. For example, if the quantity of electricity alarm value for the user's battery is 20%, and the user presets to switch to the more power-saving mode automatically if the preset alarm value is below 20%, then when the alarm value is lower than 20%, it will switch to the more power-saving mode directly.

The beneficial effects of this embodiment are as follows: acquiring the current execution state of a terminal; determining an application programming interface API invocation mode corresponding to the current execution state of the terminal according to the preset correlation between an execution state of the terminal and the API invocation mode; and executing the API control thereof under the determined API invocation mode. By way of controlling an API under different execution states at a terminal, the electricity consumption of unnecessary applications in the terminal is reduced, the quantity of electricity for the terminal is saved without increasing user operations, and the user experience is improved.

Embodiment III

Figure 3:
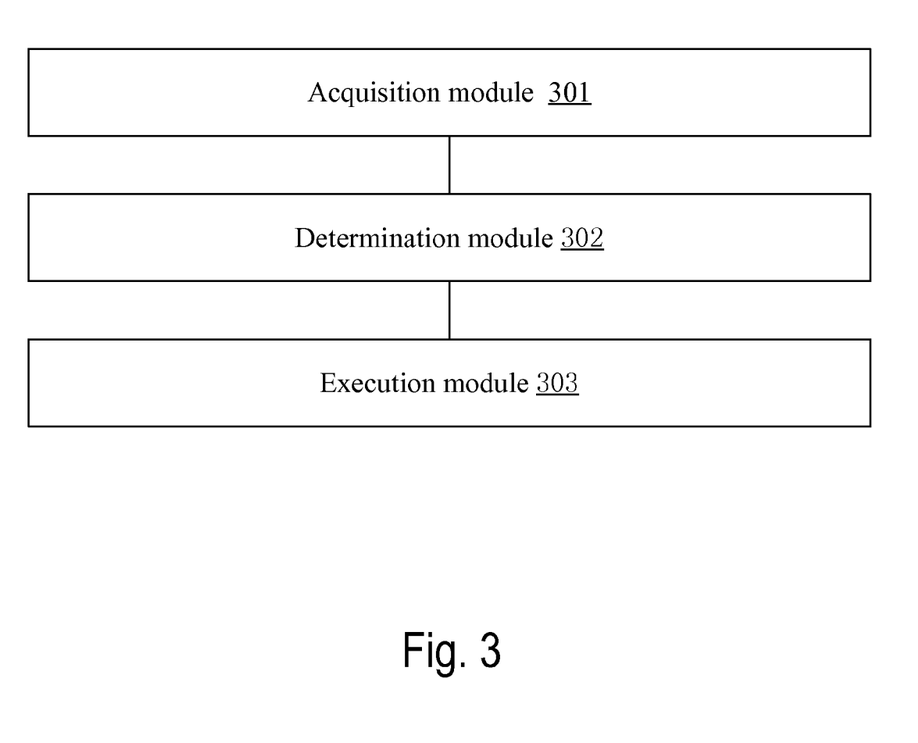
FIG. 3 is a schematic structural view of a device for controlling an application provided in accordance with some embodiments.

Referring to FIG. 3, a device for controlling an application is provided in this embodiment, comprising: an acquisition module 301, a determination module 302 and an execution module 303.

The acquisition module 301 is used for acquiring the current execution state of a terminal; the determination module 302 is used for determining an application programming interface API invocation mode corresponding to the current execution state of the terminal according to the preset correlation between an execution state of the terminal and the API invocation mode; and the execution module 303 is used for executing the API control thereof under the determined API invocation mode.

Figure 4:
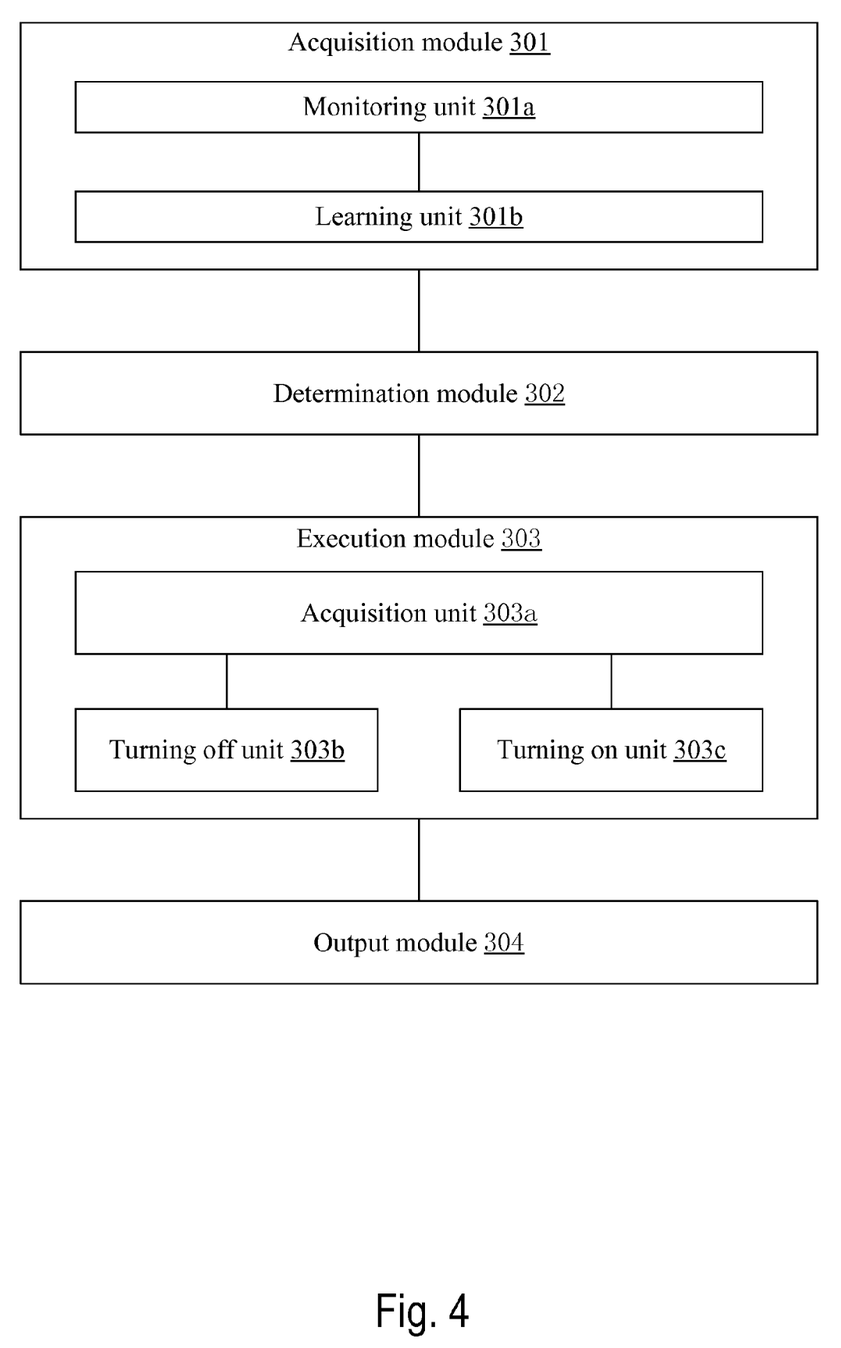
FIG. 4 is a schematic structural view of a device for controlling an application provided in accordance with some embodiments.

Referring to FIG. 4, the acquisition module 301 comprises: a monitoring unit 301a for monitoring an operation command received by the terminal; and a learning unit 301b for learning the current execution state of the terminal according to the operation command.

The API invocation mode comprises: turning on/off a preset API.

Referring to FIG. 4, the execution module 303 comprises: an acquisition unit 303a for acquiring information about an API to be turned off and/or information about an API to be turned on under the API invocation mode; a turning off unit 303b for turning off the API to be turned off according to the information thereabout; and/or, a turning on unit 303c for turning on the API to be turned on according to the information thereabout.

Optionally, referring to FIG. 4, the device further comprises: an output module 304 for outputting alarm information or adjusting the API invocation mode of the terminal when the quantity of electricity at the terminal reaches an alarm value.

The beneficial effects of this embodiment are as follows: acquiring the current execution state of a terminal; determining an application programming interface API invocation mode corresponding to the current execution state of the terminal according to the preset correlation between an execution state of the terminal and the API invocation mode; and executing the API control thereof under the determined API invocation mode. By way of controlling an API under a terminal's different execution states, the electricity consumption by unnecessary applications in the terminal is reduced, the goal of saving the quantity of electricity used by the terminal is accomplished without increasing a user's operation, and the user experience is improved.

Figure 5A:
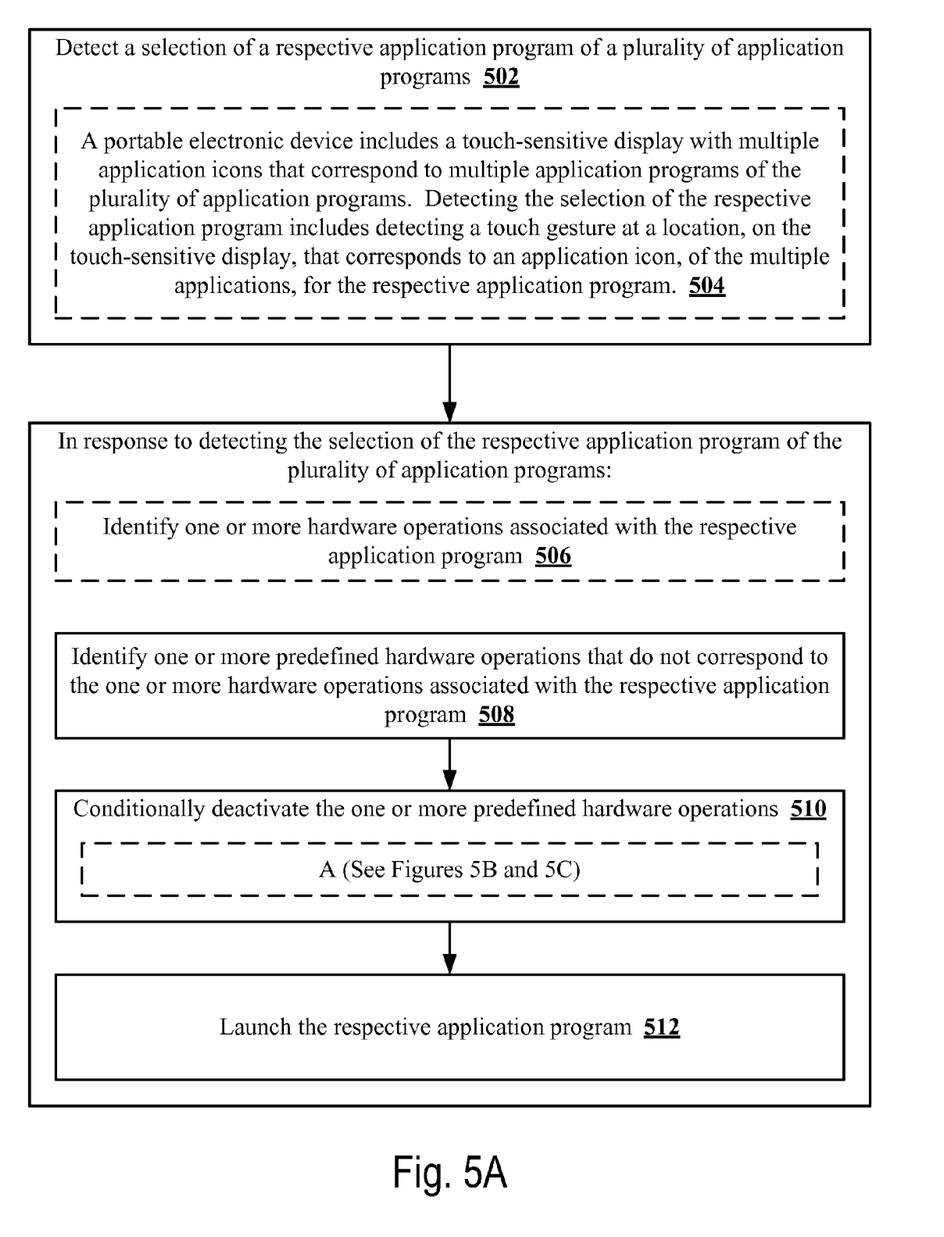
FIGS. 5A-5C are flow charts of an exemplary method for controlling a portable electronic device in accordance with some embodiments.
Figure 5B:
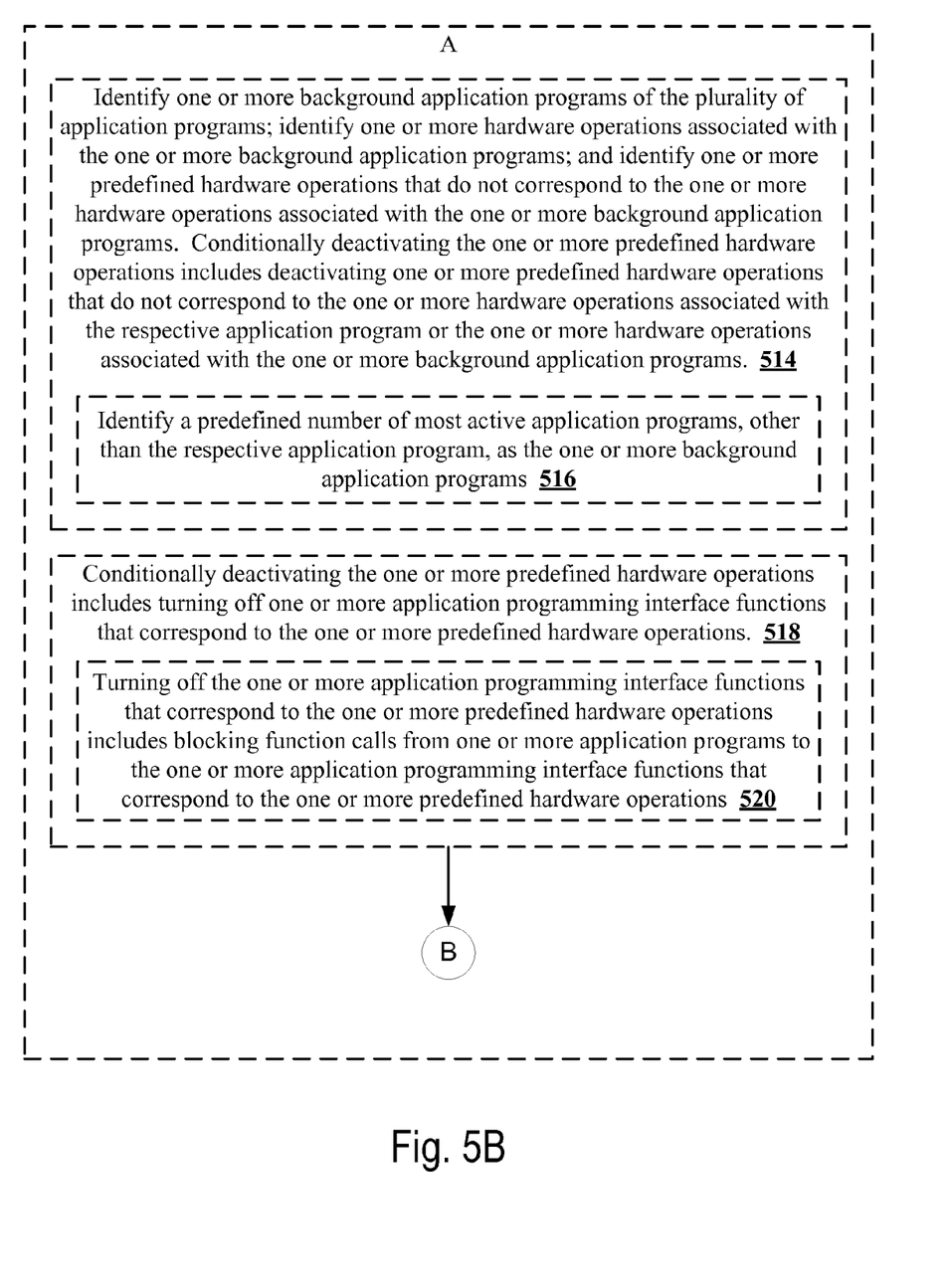
Figure 5C:
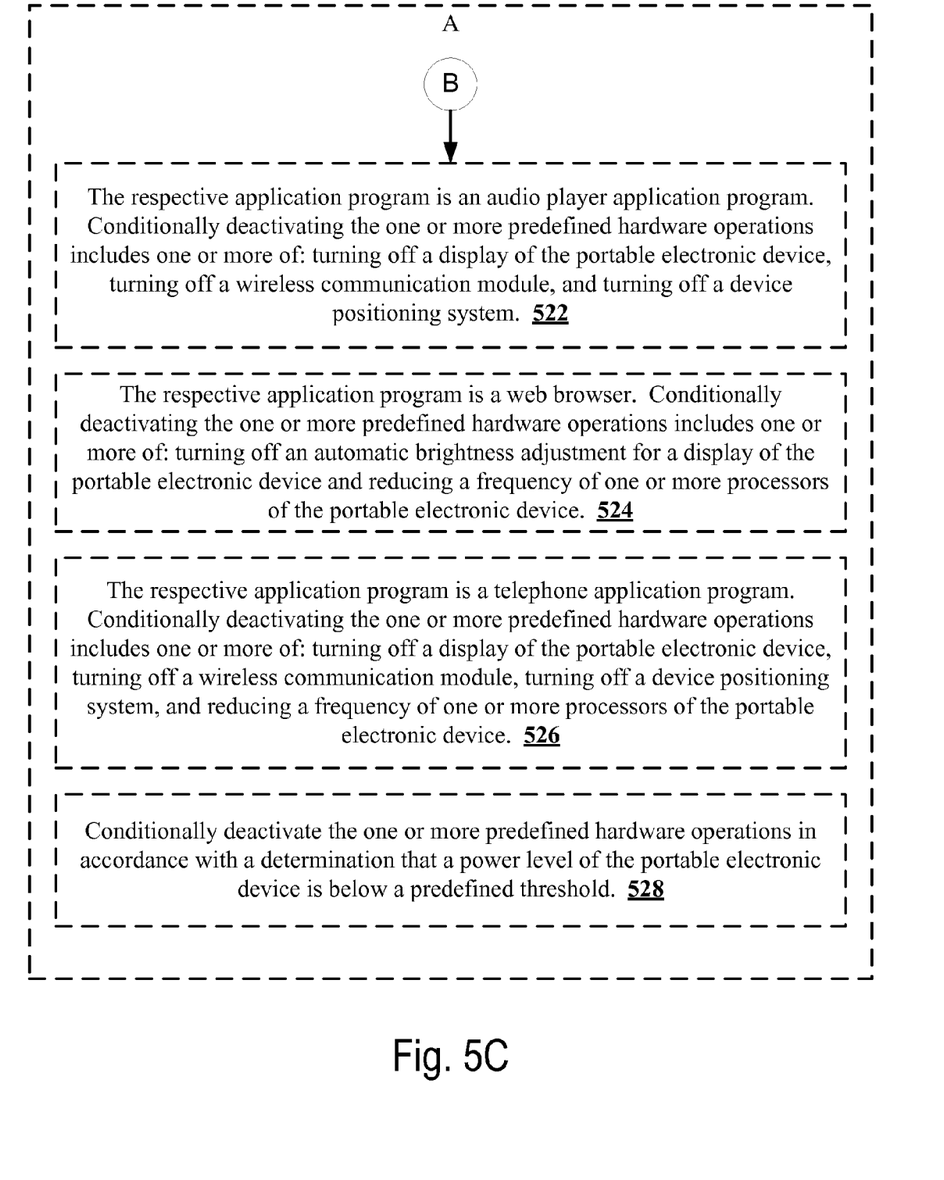

FIGS. 5A-5C are flow charts of an exemplary method for controlling a portable electronic device in accordance with some embodiments. The method is performed by a portable electronic device (e.g., the system 600 illustrated in FIG. 6) with memory storing a plurality of application programs.

The device detects (502) a selection of a respective application program of the plurality of application programs. For example, the respective application program may be selected by a mouse click or with a touch gesture on an application icon on the display of the portable electronic device.

In some embodiments, the portable electronic device includes (504) a touch-sensitive display with multiple application icons that correspond to multiple application programs of the plurality of application programs. For example, in some embodiments, the touch-sensitive display includes a display of the multiple application icons for applications stored in the portable electronic device (e.g., a web browser application icon, a music player application icon, a telephone application icon, etc.). Detecting the selection of the respective application program includes detecting a touch gesture (e.g., a tap gesture) at a location, on the touch-sensitive display, that corresponds to an application icon, of the multiple applications, for the respective application program.

In some embodiments, in response to detecting the selection of the respective application program of the plurality of application programs, the device identifies (506) one or more hardware operations associated with the respective application program. For example, in some embodiments, the device identifies that a speaker operation is associated with an audio player application (e.g., a music player application). In some embodiments, the device identifies that a display operation and a communication operation are associated with a web browser application. In some embodiments, the device identifies that a cellular communication operation is associated with a telephone application program.

In response to detecting the selection of the respective application program of the plurality of application programs, the device identifies (508) one or more predefined hardware operations that do not correspond to one or more hardware operations associated with the respective application program. In some embodiments, the device identifies one or more predefined hardware operations that do not correspond to the one or more hardware operations identified in the operation 506 described above for the respective application program. For example, in some embodiments, the device stores a list of predefined hardware operations (e.g., display operation, cellular communication operation, WiFi communication operation, device positioning operation, high frequency computing operation, etc.), and the device identifies one or more predefined hardware operations that do not correspond to the one or more identified hardware operations associated with the respective application program and generates a map data structure in the memory storing members of the list of predefined hardware operations and their respective associated hardware operations that do not correspond to the predefined hardware operations. In some embodiments, the devices provides a user interface for a user of the device to view and update the information in the map data structure. Alternatively, the device updates the information in the map data structure based on analyzing the user's activities on the device. In some embodiments, the device stores data identifying hardware operations that do not correspond to the one or more hardware operations associated with the respective application program (e.g., Table 1 described above or a lookup table), and identifies operations that do not correspond to one or more hardware operations associated with the respective application program from the data. This enables the device to identify one or more hardware operations that do not correspond to one or more hardware operations associated with the respective application program without identifying the one or more hardware operations associated with the respective application program.

The device conditionally deactivates (510) the one or more predefined hardware operations. For example, when a display operation is not associated with an audio player application, the device deactivates a display of the portable electronic device without the user's express instruction of turning off the display of the device. The device conditionally deactivates the one or more predefined hardware operations in response to detecting the selection of the respective application program of the plurality of application programs. In other words, the device conditionally deactivates the one or more predefined hardware operations without further input from a user. This eliminates the need for the user to manually deactivate one or more predefined hardware operations.

In some embodiments, the device identifies (514, FIG. 5B) one or more background application programs of the plurality of application programs. The device identifies one or more predefined hardware operations that do not correspond to one or more hardware operations associated with the one or more background application programs. Conditionally deactivating the one or more predefined hardware operations includes deactivating one or more predefined hardware operations that do not correspond to the one or more hardware operations associated with the respective application program or the one or more hardware operations associated with the one or more background application programs. For example, when the device has a web browser as a foreground application program and a music player application as a background application program (e.g., the music player runs in the background) with both application programs being active, the device does not deactivate a speaker operation because the speaker operation corresponds to a hardware operation associated with the music player application.

In some embodiments, the device identifies one or more hardware operations associated with the one or more background application programs prior to identifying one or more predefined hardware operations that do not correspond to the one or more hardware operations associated with the one or more background application programs.

In some embodiments, the device identifies (516) a predefined number of most active application programs, other than the respective application program, as the one or more background application programs. For example, in some embodiments, the device identifies only one most active application program as a single background application for identifying one or more predefined hardware operations that do not correspond to one or more hardware operations associated with the background application program. The activeness of an application program may be dependent on the amount of time during which the application program is played on the device, the number of times that the application program is invoked within a predefined time window, and the specific time period during which the application program is played. For example, the longer the application program is played, the more likely the application program is deemed to be an active application program. Similarly, if the application program is more frequently used during the day time rather than at night, the more likely the application program is treated as an active application program.

In some embodiments, conditionally deactivating the one or more predefined hardware operations includes (518) turning off one or more application programming interface functions that correspond to the one or more predefined hardware operations. In some embodiments, a respective application programming interface (API) function is used to activate a corresponding hardware operation (e.g., an API function for activating a cellular communication operation). By turning off the respective API function, the corresponding hardware operation is deactivated and more power may be saved for extending the usage of the device before the next power recharge.

In some embodiments, turning off the one or more application programming interface functions that correspond to the one or more predefined hardware operations includes (520) blocking function calls from one or more application programs to the one or more application programming interface functions that correspond to the one or more predefined hardware operations. For example, when a device positioning operation (e.g., a global positioning system (GPS) module configured to determine a position of the portable electronic device) is deactivated, the device blocks an API function call to activate the device positioning operation (e.g., from a map application in the background).

In some embodiments, turning off the one or more application programming interface functions that correspond to the one or more predefined hardware operations includes (520) ignoring function calls from one or more application programs to the one or more application programming interface functions that correspond to the one or more predefined hardware operations.

In some embodiments, the respective application program is (522, FIG. 5C) an audio player application program. Conditionally deactivating the one or more predefined hardware operations includes one or more of: turning off a display of the portable electronic device, turning off a wireless communication module, and turning off a device positioning system (e.g., the GPS module). In some embodiments, it may require different levels of user efforts to re-activate those predefined hardware operations depending on their relationship with other application programs. For example, the display of the device is used by many different application programs and it may be turned on by a single user touch gesture. Conversely, the GPS module may remain deactivated until the user starts an application program (e.g., a navigation application) that cannot perform basic functions with the GPS module being deactivated.

In some embodiments, the respective application program is (524) a web browser. Conditionally deactivating the one or more predefined hardware operations includes one or more of: turning off an automatic brightness adjustment for a display of the portable electronic device and reducing an operating frequency of one or more processors of the portable electronic device.

In some embodiments, the respective application program is (526) a telephone application program. Conditionally deactivating the one or more predefined hardware operations includes one or more of: turning off a display of the portable electronic device, turning off a wireless communication module, turning off a device positioning system, and reducing an operating frequency of one or more processors of the portable electronic device.

In some embodiments, the device conditionally deactivates (528) the one or more predefined hardware operations in accordance with a determination that a battery power level of the portable electronic device is below a predefined threshold (e.g., 20%). In some embodiments, the device monitors the battery power level of the portable electronic device, and performs one or more of the operations 510 and 514-526 described above while the battery power level of the portable electronic device is below the predefined threshold.

The device launches (512, FIG. 5A) the respective application program. In some embodiments, as a result of launching the respective application program, the respective application program runs as a foreground application. In some embodiments, the device displays a user interface of the respective application program. In some embodiments, launching the respective application program includes moving the respective application program from the background to the foreground.

Figure 6:
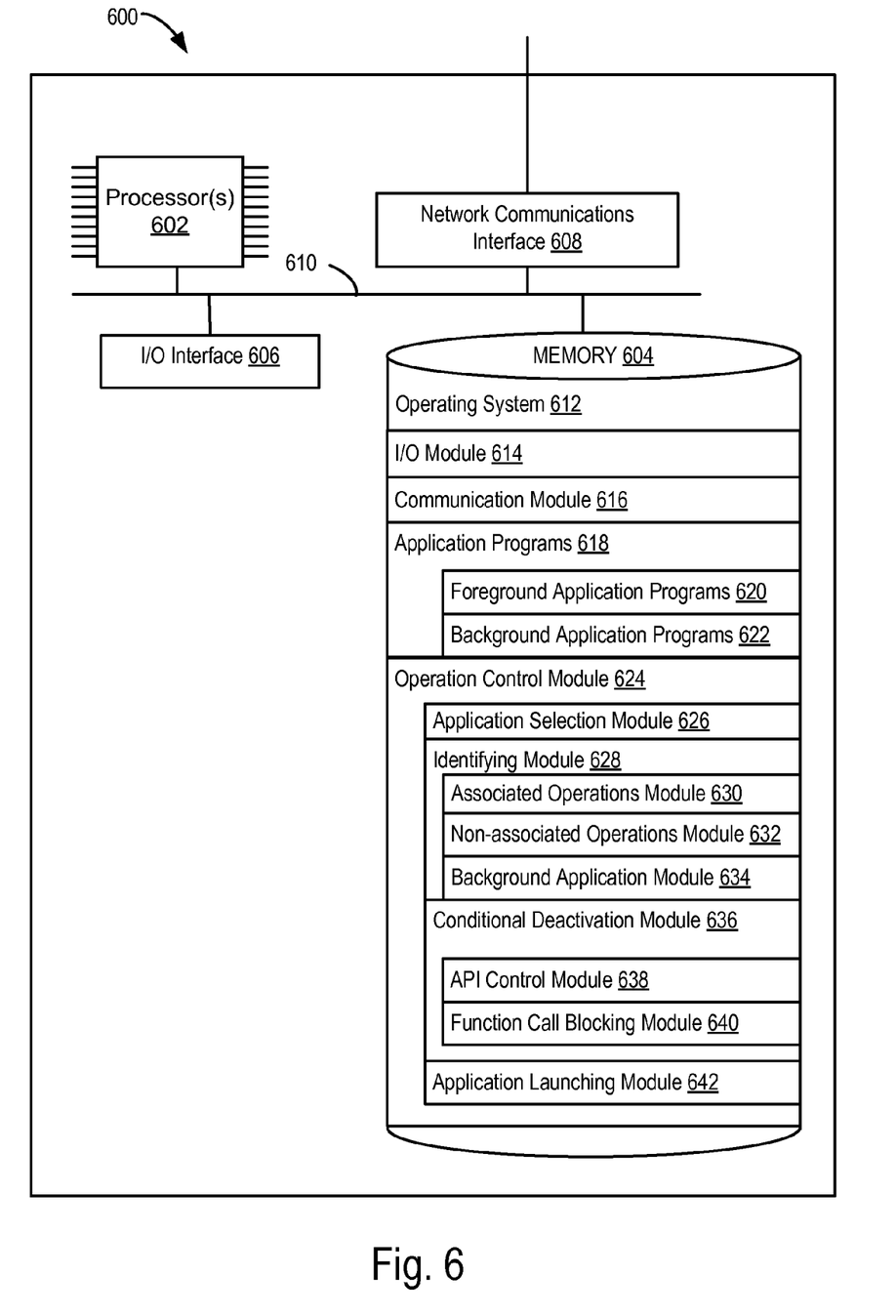
FIG. 6 is a block diagram of a system for implementing the method of controlling a portable electronic device in accordance with some embodiments.

FIG. 6 is a block diagram of a system 600 for implementing the method of controlling a portable electronic device, as described above, in accordance with some embodiments. In some embodiments, the system 602 is one of: mobile device, handheld computer, and tablet computer.

As shown in FIG. 6, the system 600 includes one or more processing units (also called herein "processors") 602, memory 604, an input/output (I/O) interface 606, and a network communications interface 608. These components communicate with one another over one or more communication buses or signal lines 610. In some embodiments, the memory 604, or the computer readable storage media of memory 604, stores programs, modules, instructions, and data structures including all or a subset of: an operating system 612, an I/O module 614, a communication module 616, application programs 618, and an operation control module 624. The one or more processors 602 are coupled to the memory 604 and operable to execute these programs, modules, and instructions, and reads/writes from/to the data structures.

In some embodiments, the processing units 602 include one or more microprocessors, such as a single core or multi-core microprocessor. In some embodiments, the processing units 602 include one or more general purpose processors. In some embodiments, the processing units 602 include one or more special purpose processors.

In some embodiments, the memory 604 includes high-speed random access memory, such as DRAM, SRAM, DDR RAM or other random access solid state memory devices. In some embodiments the memory 604 includes non-volatile memory, such as one or more magnetic disk storage devices, optical disk storage devices, flash memory devices, or other non-volatile solid state storage devices. In some embodiments, the memory 604 includes one or more storage devices remotely located from the processing units 602. The memory 604, or alternately the non-volatile memory device(s) within the memory 604, comprises a computer readable storage medium. In some embodiments, the memory 604 comprises a non-transitory computer readable storage medium.

In some embodiments, the I/O interface 606 couples one or more input/output devices, such as one or more displays (e.g., a touch-sensitive display, also called a touch screen), a keyboards, touch screens, speakers, and microphones, to the I/O module 614 of the system 600. The I/O interface 606, in conjunction with the I/O module 614, receive user inputs (e.g., voice input, keyboard inputs, touch inputs, etc.) and process them accordingly. The I/O interface 606 and the I/O module 614 also present outputs (e.g., sounds, images, text, etc.) to the user according to various program instructions implemented on the system 600.

In some embodiments, the network communications interface 608 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, WiFi, VoIP, Wi-MAX, or any other suitable communication protocol. The network communications interface 608 enables communication between the system 600 with networks, such as the Internet, an intranet and/or a wireless network, such as a cellular telephone network, a wireless local area network (LAN) and/or a metropolitan area network (MAN), and other devices. The communications module 616 facilitates communications between the system 600 and other devices (e.g., the first client device and the second client device) over the network communications interface 608.

In some embodiments, the operating system 602 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

In some embodiments, the system 600 is implemented on a portable electronic device (e.g., a smart phone, a mobile phone, a tablet computer, etc.). It should be noted that the system 600 is only one example, and that the system 600 may have more or fewer components than shown, may combine two or more components, or may have a different configuration or arrangement of the components. The various components shown in FIG. 6 may be implemented in hardware, software, firmware, including one or more signal processing and/or application specific integrated circuits, or a combination of thereof.

In FIG. 6, the application programs 618 stored in the memory 604 include one or more foreground application programs 620 and one or more background application programs 622. A foreground application program typically refers to an application program a user interface of which is currently displayed on a display of the system 600. For example, in FIG. 5A, when a web browser displays a web page on a touch-sensitive display, the web browser is a foreground application program. In comparison, a background application program typically refers to a currently running application program a user interface of which is not currently displayed on the display of the system. A background application program is distinct from a closed application program that is not running on the system. For example, when the system stores a calendar application program but does not run the calendar application program, the calendar application is deemed to be closed (e.g., no instruction of the calendar application program is executed by processor(s) 602 of the system 600). In comparison, when the system runs the calendar application program but does not display a user interface of the calendar application program, the calendar application program is deemed to be running in the background. Typically, an application program is deemed to be running when at least one process associated with the application program is being executed by one or more processors 602 of the system 600. In some embodiments, the application program is deemed to be running when at least one process associated with the application program is executed at one or more predefined intervals independent of a user input by one or more processors 602 of the system 600.

As shown in FIG. 6, the system 600 stores the operation control module 624 in the memory 604. In some embodiments, the operation control module 624 further includes the followings sub-modules, or a subset or superset thereof: an application selection module 626, an identifying module 628, a conditional deactivation module 636, and an application launching module 642.

In some embodiments, the application selection module 626 is configured to access the I/O interface 606 through the I/O module 614. For example, in some embodiments, the application selection module 626 detects a selection of a respective application program by detecting a touch gesture at a location, on a touch-sensitive display, that corresponds to an application icon displayed on the touch-sensitive display.

In some embodiments, the identifying module 628 includes one or more of: an associated operations module 630, a non-associated operations module 632, and a background application module 634. In some embodiments, the associated operations module 630 is configured to identify one or more hardware operations associated with a respective application program. In some embodiments, the non-associated operations module 632 is configured to identify one or more predefined hardware operations that do not correspond to the one or more hardware operations associated with a respective application program. In some embodiments, the background application module 634 is configured to identify one or more background application programs, one or more hardware operations associated with the one or more background application programs, and one or more predefined hardware operations that do not correspond to the one or more hardware operations associated with the one or more background application programs. In some embodiments, the background application module 634 is also configured to identify a predefined number of most active application programs.

In some embodiments, the conditional deactivation module 636 includes one or more of: an API control module 638 and a function call blocking module 640. In some embodiments, the API control module 638 is configured to turn off one or more application programming interface functions that correspond to one or more predefined hardware operations that do not correspond to one or more hardware operations associated with a respective application program. In some embodiments, the function call blocking module 640 is configured to block function calls from one or more application programs to one or more application programming interface functions that correspond to the one or more predefined hardware operations that do not correspond to one or more hardware operations associated with a respective application program.

In some embodiments, the application launching module 642 has access to the application programs 618 stored in the memory 604 and/or one or more predefined commands to launch an application program in the operating system 612.

In some embodiments, the operation control module 624 optionally includes one or more other modules to provide other related functionalities described herein.

Details on the structures, functions, and interactions of the operation control module 624 are provided with respect to FIGS. 1-4 and 5A-5C and accompanying descriptions.

It should be noted that in the device for controlling an application provided in the abovementioned embodiments, illustration is only made by way of example according to the division of the above-mentioned functional modules, and in practical application, the above-mentioned functions can be assigned to be completed by different functional modules as required, i.e., dividing the internal structure of the device into different functional modules to complete all or some of the above-described functions.

In addition, the device for controlling an application and the method for controlling an application provided by the above-mentioned embodiments belong to the same concept, and its specific implementation process can be seen in the method embodiment, which will not be repeated here for brevity.

The sequence numbers of the abovementioned embodiments of the present invention are merely for description purposes, and do not represent the advantages or disadvantages of the embodiments.

Those skilled in the art can understand that all or part of the steps of the abovementioned embodiments can be implemented by hardware, and can also be implemented by a program instructing relevant hardware, and the program can be stored on a computer readable storage medium, and the abovementioned storage medium can be a random access memory, a magnetic disk, or an optical disk, and so on.

What are described above are merely exemplary embodiments of the present invention and are not used to limit the scope of claims, and any modifications, equivalent substitutions, improvements and so on made within the spirit and principles of the present invention shall all be deemed to be within the scope of the claims.

What is claimed is:

1. A method performed by a portable electronic device with memory storing a plurality of application programs, the method comprising:
   detecting a selection of a respective application program of the plurality of application programs;
   in response to detecting the selection of the respective application program of the plurality of application programs:
   identifying a first set of one or more predefined hardware operations that do not correspond to one or more hardware operations associated with the respective application program;
   identifying one or more background application programs of the plurality of application programs including identifying a predefined number of most active application programs, other than the respective application program, as the one more background application programs based on one or more of: an amount of time during which an application program is played on the device, a number of times that the application program is invoked within a predefined time window, and a specific time period during which the application program is played;
   identifying one or more hardware operations associated with the one or more background application programs; and
   identifying a second set of one or more predefined hardware operations that do not correspond to the one or more hardware operations associated with the one or more background application programs;
   conditionally deactivating a third set of one or more predefined hardware operations that is a subset of the first set of one or more predefined hardware operations or the second set of one or more predefined hardware operations; and
   launching the respective application program.

2. The method of claim 1, wherein conditionally deactivating the third set of one or more predefined hardware operations includes turning off one or more application programming interface functions that correspond to the third set of one or more predefined hardware operations.

3. The method of claim 2, wherein turning off the one or more application programming interface functions that correspond to the third set of one or more predefined hardware operations includes blocking function calls from one or more application programs to the one or more application programming interface functions that correspond to the third set of one or more predefined hardware operations.

4. The method of claim 1, wherein:
   the respective application program is an audio player application program; and
   conditionally deactivating the third set of one or more predefined hardware operations includes one or more of: turning off a display of the portable electronic device, turning off a wireless communication module, and turning off a device positioning system.

5. The method of claim 1, wherein:
   the respective application program is a web browser; and
   conditionally deactivating the third set of one or more predefined hardware operations includes one or more of: turning off an automatic brightness adjustment for a display of the portable electronic device and reducing an operating frequency of one or more processors of the portable electronic device.

6. The method of claim 1, wherein:
   the respective application program is a telephone application program; and
   conditionally deactivating the third set of one or more predefined hardware operations includes one or more of: turning off a display of the portable electronic device, turning off a wireless communication module, turning off a device positioning system, and reducing an operating frequency of one or more processors of the portable electronic device.

7. The method of claim 1, wherein the portable electronic device includes a touch-sensitive display with multiple application icons that correspond to multiple application programs of the plurality of application programs, and detecting the selection of the respective application program includes detecting a touch gesture, on the touch-sensitive display, that corresponds to an application icon, of the multiple applications, for the respective application program.

8. The method of claim 1, including conditionally deactivating the third set of one or more predefined hardware operations in accordance with a determination that a battery power level of the portable electronic device is below a predefined threshold.

9. The method of claim 1, wherein an association of one or more hardware operations with the respective application program is adjusted according to an actual usage of the portable electronic device.

10. A portable electronic device, comprising:
one or more processors; and
memory storing a plurality of application programs, the memory further storing instructions for executions by the one or more processors, the instructions comprising instructions for:
  detecting a selection of a respective application program of the plurality of application programs;
  in response to detecting the selection of the respective application program of the plurality of application programs:
    identifying a first set of one or more predefined hardware operations that do not correspond to one or more hardware operations associated with the respective application program;
    identifying one or more background application programs of the plurality of application programs including identifying a predefined number of most active application programs, other than the respective application program, as the one or more background application programs based on one or more of: an amount of time during which an application program is played on the device, a number of times that the application program is invoked within a predefined time window, and a specific time period during which the application program is played;
    identifying one or more hardware operations associated with the one or more background application programs;
    identifying a second set of one or more predefined hardware operations that do not correspond to the one or more hardware operations associated with the one or more background application programs;
    conditionally deactivating a third set of one or more predefined hardware operations that is a subset of the first set of one or more predefined hardware operations or the second set of one or more predefined hardware operations; and
    launching the respective application program.

11. The device of claim 10, wherein the instructions for conditionally deactivating the third set of one or more predefined hardware operations include instructions for turning off one or more application programming interface functions that correspond to the third set of one or more predefined hardware operations.

12. The device of claim 10, wherein:
the respective application program is an audio player application program; and
the instructions for conditionally deactivating the third set of one or more predefined hardware operations include instructions for one or more of: turning off a display of the portable electronic device, turning off a wireless communication module, and turning off a device positioning system.

13. The device of claim 10, wherein an association of one or more hardware operations with the respective application program is adjusted according to an actual usage of the portable electronic device.

14. A non-transitory computer readable storage medium storing a plurality of application programs and instructions for execution by one or more processors of a portable electronic device, the instructions comprising instructions for:
  detecting a selection of a respective application program of the plurality of application programs;
  in response to detecting the selection of the respective application program of the plurality of application programs:
    identifying a first set of one or more predefined hardware operations that do not correspond to one or more hardware operations associated with the respective application program;
    identifying one or more background application programs of the plurality of application programs including identifying a predefined number of most active application programs, other than the respective application program, as the one or more background application programs based on one or more of: an amount of time during which an application program is played on the device, a number of times that the application program is invoked within a predefined time window, and a specific time period during which the application program is played;
    identifying one or more hardware operations associated with the one or more background application programs;
    identifying a second set of one or more predefined hardware operations that do not correspond to the one or more hardware operations associated with the one or more background application programs;
    conditionally deactivating a third set of one or more predefined hardware operations that is a subset of the first set of one or more predefined hardware operations or the second set of one or more predefined hardware operations; and
    launching the respective application program.

15. The computer readable storage medium of claim 14, wherein the instructions for conditionally deactivating the third set of one or more predefined hardware operations include instructions for turning off one or more application programming interface functions that correspond to the third set of one or more predefined hardware operations.

16. The computer readable storage medium of claim 14, wherein:
the respective application program is an audio player application program; and
the instructions for conditionally deactivating the third set of one or more predefined hardware operations include instructions for one or more of: turning off a display of the portable electronic device, turning off a wireless communication module, and turning off a device positioning system.

17. The computer readable storage medium of claim 14, wherein an association of one or more hardware operations with the respective application program is adjusted according to an actual usage of the portable electronic device.

* * * * *